(12) United States Patent
Daw Perez et al.

(10) Patent No.: US 12,060,165 B2
(45) Date of Patent: Aug. 13, 2024

(54) SYSTEMS AND METHODS FOR SAFELY OPERATING AUTONOMOUS CARGO HANDLING SYSTEMS

(71) Applicant: GOODRICH CORPORATION, Charlotte, NC (US)

(72) Inventors: Zamira A. Daw Perez, Albany, CA (US); Alessandro Pinto, Kensington, CA (US); Richa Varma, Emeryville, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 475 days.

(21) Appl. No.: 17/222,181

(22) Filed: Apr. 5, 2021

(65) Prior Publication Data

US 2021/0316863 A1   Oct. 14, 2021

Related U.S. Application Data

(60) Provisional application No. 63/009,810, filed on Apr. 14, 2020.

(51) Int. Cl.
*B64D 9/00* (2006.01)
(52) U.S. Cl.
CPC .......... *B64D 9/00* (2013.01); *B64D 2009/006* (2013.01)
(58) Field of Classification Search
None
See application file for complete search history.

(56) References Cited

U.S. PATENT DOCUMENTS

| 4,713,753 A | 12/1987 | Boebert et al. |
|---|---|---|
| 6,429,810 B1 | 8/2002 | De Roche |
| 7,151,447 B1 | 12/2006 | Willms et al. |
| 7,198,227 B2 | 4/2007 | Olin et al. |
| 7,936,271 B2 | 5/2011 | Karr et al. |
| 7,986,238 B2 | 7/2011 | Cho |
| 8,036,776 B2 | 10/2011 | Hellberg et al. |
| 8,622,298 B2 | 1/2014 | Huber |
| 8,788,085 B2 | 7/2014 | Panzram et al. |
| 8,869,293 B2 | 10/2014 | Wang et al. |
| 9,064,225 B2 | 6/2015 | Nakra et al. |

(Continued)

OTHER PUBLICATIONS

USPTO, Non-Final Office Action dated Dec. 20, 2021 in U.S. Appl. No. 17/222,003.

(Continued)

*Primary Examiner* — Peter D Nolan
*Assistant Examiner* — Jacob Kent Besteman-Street
(74) *Attorney, Agent, or Firm* — SNELL & WILMER L.L.P.

(57) ABSTRACT

A method for performing a safety assessment of a cargo handling system controlled by a processor and having a plurality of sensing agents is disclosed. In various embodiments, the method includes receiving by the processor a run-time database from the plurality of sensing agents, the run-time database including data from which a positioning of a plurality of objects on the cargo handling system may be determined; generating by the processor a mapping of the positioning of the plurality of objects; validating by the processor whether a run-time state of the cargo handling system is in violation of a safety protocol; and determining by the processor whether to implement a corrective action.

17 Claims, 6 Drawing Sheets

(56) References Cited

U.S. PATENT DOCUMENTS

| | | |
|---|---|---|
| 9,194,932 B2 | 11/2015 | Lee et al. |
| 9,349,270 B1 | 5/2016 | Crossno |
| 9,501,920 B2 | 11/2016 | Harring et al. |
| 9,557,742 B2 | 1/2017 | Paduano et al. |
| 9,607,281 B2 | 3/2017 | Lee et al. |
| 9,607,282 B2 | 3/2017 | Brosius, III |
| 9,886,799 B2 | 2/2018 | Kwak |
| 9,928,474 B1 | 3/2018 | Evans |
| 9,944,213 B2 | 4/2018 | Ambrosio et al. |
| 10,005,564 B1* | 6/2018 | Bhatia ................... B64C 1/20 |
| 10,014,076 B1 | 7/2018 | LaBorde |
| 10,059,450 B2 | 8/2018 | Levron |
| 10,134,007 B2 | 11/2018 | Göllü |
| 10,431,019 B2 | 10/2019 | Dorkel et al. |
| 10,531,259 B2 | 1/2020 | Neves et al. |
| 10,540,218 B2 | 1/2020 | Freitag et al. |
| 10,565,046 B2 | 2/2020 | Tran Van |
| 10,589,872 B1 | 3/2020 | Sundararaj |
| 10,682,759 B1 | 6/2020 | Oelrich et al. |
| 11,010,025 B2 | 5/2021 | Balasubramanian |
| 2003/0093187 A1 | 5/2003 | Walker |
| 2004/0074739 A1 | 4/2004 | Nguyen et al. |
| 2005/0195080 A1 | 9/2005 | Ng et al. |
| 2005/0198291 A1 | 9/2005 | Hull et al. |
| 2006/0038077 A1 | 2/2006 | Olin |
| 2006/0113302 A1 | 6/2006 | Mandava et al. |
| 2008/0009968 A1 | 1/2008 | Bruemmer et al. |
| 2009/0146805 A1 | 6/2009 | Joao |
| 2010/0100225 A1 | 4/2010 | Reed |
| 2012/0101636 A1* | 4/2012 | Huber ................... B64D 9/00 700/275 |
| 2012/0235791 A1 | 9/2012 | Donlan et al. |
| 2012/0312926 A1 | 12/2012 | Holzner et al. |
| 2013/0159205 A1 | 6/2013 | Schnorwangen et al. |
| 2013/0166063 A1 | 6/2013 | Panzram et al. |
| 2013/0297065 A1 | 11/2013 | Huber |
| 2013/0313073 A1* | 11/2013 | Huber ................... B64D 9/00 198/464.2 |
| 2015/0254600 A1 | 9/2015 | Murthy et al. |
| 2015/0254604 A1 | 9/2015 | Arora |
| 2015/0298808 A1 | 10/2015 | Huber |
| 2015/0321768 A1 | 11/2015 | Kumar et al. |
| 2016/0042321 A1 | 2/2016 | Held |
| 2017/0061370 A1 | 3/2017 | Choi et al. |
| 2017/0372105 A1 | 12/2017 | Coxall |
| 2018/0039941 A1 | 2/2018 | Kamir et al. |
| 2018/0086548 A1 | 3/2018 | Heath |
| 2018/0089622 A1 | 3/2018 | Burch, V et al. |
| 2018/0332455 A1 | 11/2018 | Neves et al. |
| 2019/0202561 A1 | 7/2019 | Weekes et al. |
| 2019/0213529 A1 | 7/2019 | Donnelly et al. |
| 2019/0256211 A1 | 8/2019 | Murthy et al. |
| 2019/0256227 A1 | 8/2019 | Balasubramanian et al. |
| 2019/0304210 A1 | 10/2019 | Lawrence et al. |
| 2020/0122835 A1 | 4/2020 | Daw Perez et al. |
| 2020/0122858 A1* | 4/2020 | Daw Perez ............. B66F 7/065 |
| 2020/0201984 A1 | 6/2020 | Dhavali et al. |
| 2020/0202640 A1 | 6/2020 | Tucker |
| 2021/0284449 A1 | 9/2021 | Rogers |
| 2021/0316863 A1 | 10/2021 | Daw Perez et al. |
| 2021/0316864 A1* | 10/2021 | Daw Perez ............... B64C 1/20 |
| 2021/0319397 A1 | 10/2021 | Daw Perez et al. |
| 2022/0036302 A1 | 2/2022 | Cella et al. |
| 2022/0065631 A1 | 3/2022 | Lee |

OTHER PUBLICATIONS

USPTO; Advisory Action dated Jan. 6, 2023 in U.S. Appl. No. 17/221,966.

USPTO; Non-Final Office Action dated Mar. 3, 2023 in U.S. Appl. No. 17/221,966.

USPTO; Final Office Action dated Mar. 20, 2023 in U.S. Appl. No. 17/222,003.

USPTO; Final Office Action dated Oct. 20, 2022 in U.S. Appl. No. 17/221,966.

USPTO; Non-Final Office Action dated Apr. 1, 2022 in U.S. Appl. No. 17/221,966.

USPTO; Final Office Action dated Apr. 11, 2022 in U.S. Appl. No. 17/222,003.

USPTO; Non-Final Office Action dated Sep. 14, 2022 in U.S. Appl. No. 17/222,003.

USPTO; Advisory Action dated Nov. 27, 2023 in U.S. Appl. No. 17/221,966.

USPTO; Final Office Action dated Sep. 7, 2023 in U.S. Appl. No. 17/221,966.

USPTO; Non-Final Office Action dated Aug. 28, 2023 in U.S. Appl. No. 17/222,025.

USPTO; Non-Final Office Action dated Sep. 20, 2023 in U.S. Appl. No. 17/222,227.

USPTO; Non-Final Office Action dated Feb. 20, 2024 in U.S. Appl. No. 17/222,110.

USPTO; Notice of Allowance dated Mar. 1, 2024 in U.S. Appl. No. 17/222,025.

USPTO; Corrected Notice of Allowance dated Feb. 12, 2024 in U.S. Appl. No. 17/222,025.

USPTO; Final Office Action dated Feb. 12, 2024 in U.S. Appl. No. 17/222,227.

USPTO; Corrected Notice of Allowance dated Feb. 16, 2024 in U.S. Appl. No. 17/222,025.

USPTO; Non-Final Office Action dated Dec. 21, 2023 in U.S. Appl. No. 17/221,966.

USPTO; Notice of Allowance dated Jan. 4, 2024 in U.S. Appl. No. 17/222,025.

USPTO; Advisory Action dated Apr. 15, 2024 in U.S. Appl. No. 17/222,227.

USPTO; Notice of Allowance dated May 21, 2024 in U.S. Appl. No. 17/222,110.

USPTO; Notice of Allowance dated May 16, 2024 in U.S. Appl. No. 17/222,227.

USPTO; Final Office Action dated Jun. 10, 2024 in U.S. Appl. No. 17/221,966.

USPTO; Notice of Allowance dated May 30, 2024 in U.S. Appl. No. 17/222,110.

* cited by examiner

SYSTEMS AND METHODS FOR SAFELY OPERATING AUTONOMOUS CARGO HANDLING SYSTEMS

CROSS-REFERENCE TO RELATED APPLICATIONS

This application claims priority to, and the benefit of, U.S. Provisional Patent Application No. 63/009,810, filed Apr. 14, 2020 and titled "SYSTEMS AND METHODS FOR SAFELY OPERATING AUTONOMOUS CARGO HANDLING SYSTEMS," which application is incorporated herein by reference in its entirety for all purposes.

FIELD

The present disclosure relates generally to cargo handling systems and, more particularly, to methods, apparatus and systems used for safely operating autonomous cargo handling systems.

BACKGROUND

Cargo handling systems for aircraft typically include various tracks and rollers disposed on a cargo deck that spans the length of a cargo compartment. Cargo may be loaded from an entrance of the aircraft and transported by the cargo system to forward or aft locations, depending upon the configuration of the aircraft. Cargo handling systems, such as, for example, those used on aircraft for transport of heavy containerized cargo or pallets, also referred to herein as unit load devices (ULDs), typically include roller trays containing transport rollers that support and transport the containerized cargo or pallets. Motor driven rollers are typically employed in these systems. In certain aircraft, a plurality of motor driven power drive units (PDUs) is used to propel the containers or pallets within the cargo compartment. This configuration facilitates transportation of the containers or pallets within the cargo compartment by one or more operators or autonomous systems controlling operation of the PDUs. Autonomous cargo handling systems generally include a plurality of multi-modal sensors in electronic communication with one another and configured to monitor or control operation of the systems. Systems and methods configured to detect and report on the real-time operational status of cargo handling systems configured for autonomous operation and the real-time conditions of the cargo being transported over such systems are advantageous both to owners and operators of the cargo handling systems and to the owners of the cargo being transported.

SUMMARY

A method for performing a safety assessment of a cargo handling system controlled by a processor and having a plurality of sensing agents is disclosed. In various embodiments, the method includes receiving by the processor a run-time database from the plurality of sensing agents, the run-time database including data from which a positioning of a plurality of objects on the cargo handling system may be determined; generating by the processor a mapping of the positioning of the plurality of objects; validating by the processor whether a run-time state of the cargo handling system is in violation of a safety protocol; and determining by the processor whether to implement a corrective action.

In various embodiments, the plurality of objects includes a first unit load device and a second unit load device. In various embodiments, the step of generating by the processor the mapping of the positioning of the plurality of objects includes predicting a future state of the first unit load device and the second unit load device. In various embodiments, the step of predicting the future state of the first unit load device includes multiplying a first run-time velocity by a time step to obtain a future location of the first unit load device and predicting the future state of the second unit load device includes multiplying a second run-time velocity by the time step to obtain the future location of the second unit load device. In various embodiments, the violation of the safety protocol occurs if the processor determines an overlap between a first object space surrounding the first unit load device and a second object space surrounding the second unit load device at the future state. In various embodiments, the corrective action includes instructing, by the processor, the cargo handling system to slow or to halt a translation along a conveyance surface of the cargo handling system of at least one of the first unit load device or the second unit load device.

In various embodiments, the plurality of objects includes a unit load device and a wall of an aircraft envelope, the cargo handling system being housed within the aircraft envelope. In various embodiments, the step of generating by the processor the mapping of the positioning of the plurality of objects includes predicting a future state of the unit load device with respect to the wall. In various embodiments, the step of predicting the future state of the unit load device includes multiplying a run-time velocity by a time step to obtain a future location of the unit load device with respect to the wall. In various embodiments, the violation of the safety protocol occurs if the processor determines an overlap between an object space surrounding the unit load device and the wall. In various embodiments, the corrective action includes instructing, by the processor, the cargo handling system to slow or to halt a translation along a conveyance surface of the cargo handling system of the unit load device.

In various embodiments, the plurality of objects includes a unit load device and a human with an aircraft envelope, the cargo handling system being housed within the aircraft envelope. In various embodiments, the step of generating by the processor the mapping of the positioning of the plurality of objects includes predicting a future state of the unit load device with respect to the human. In various embodiments, the step of predicting the future state of the unit load device includes multiplying a run-time velocity by a time step to obtain a future location of the unit load device with respect to the human. In various embodiments, the violation of the safety protocol occurs if the processor determines an overlap between an object space surrounding the unit load device and the human. In various embodiments, the corrective action includes instructing, by the processor, the cargo handling system to slow or to halt a translation along a conveyance surface of the cargo handling system of the unit load device.

A cargo handling system configured for autonomous control is disclosed. In various embodiments, the system includes a processor in operable communication with a plurality of sensing agents, the plurality of sensing agents configured to transmit a run-time database from the plurality of sensing agents, the run-time database including data from which a positioning of a plurality of objects on the cargo handling system may be determined, where the processor is configured to generate a mapping of the positioning of the plurality of objects, validate whether a run-time state of the cargo handling system is in violation of a safety protocol, and determine whether to implement a corrective action.

In various embodiments, the processor is configured to predict a future state of the plurality of objects by multiplying a run-time velocity by a time step for the plurality of objects to obtain a future location of the plurality of objects. In various embodiments, the processor is configured to determine an overlap between a first object space surrounding a first object of the plurality of objects and a second object space surrounding a second object of the plurality of objects. In various embodiments, the processor is configured to slow or to halt a translation along a conveyance surface of the cargo handling system of at least one of the first object or the second object.

The forgoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
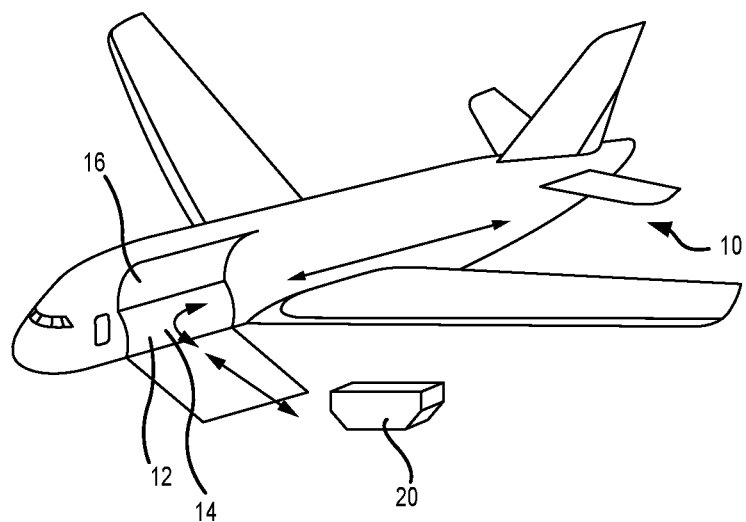
FIG. 1A illustrates a schematic view of an aircraft being loaded with cargo, in accordance with various embodiments.

With reference to FIG. 1A, a schematic view of an aircraft 10 having a cargo deck 12 located within a cargo compartment 14 is illustrated, in accordance with various embodiments. The aircraft 10 may comprise a cargo load door 16 located, for example, at one side of a fuselage structure of the aircraft 10. A unit load device (ULD) 20, in the form of a container or a pallet, for example, may be loaded through the cargo load door 16 and onto the cargo deck 12 of the aircraft 10 or, conversely, unloaded from the cargo deck 12 of the aircraft 10. In general, ULDs are available in various sizes and capacities, while pallets are typically standardized in dimension and shape; the disclosure proceeds by referring generally to ULDs, though the disclosure is equally applicable to pallets and the various cargo placed thereon. Once loaded with items destined for shipment, the ULD 20 is transferred to the aircraft 10 and then loaded onto the aircraft 10 through the cargo load door 16 using a conveyor ramp, scissor lift or the like. Once inside the aircraft 10, the ULD 20 is moved within the cargo compartment 14 to a final stowed position. Multiple ULDs may be brought on-board the aircraft 10, with each ULD 20 being placed in a respective stowed position on the cargo deck 12. After the aircraft 10 has reached its destination, each ULD 20 is unloaded from the aircraft 10 in similar fashion, but in reverse sequence to the loading procedure. To facilitate movement of the ULD 20 along the cargo deck 12, the aircraft 10 may include a cargo handling system as described herein in accordance with various embodiments.

Figure 1B:
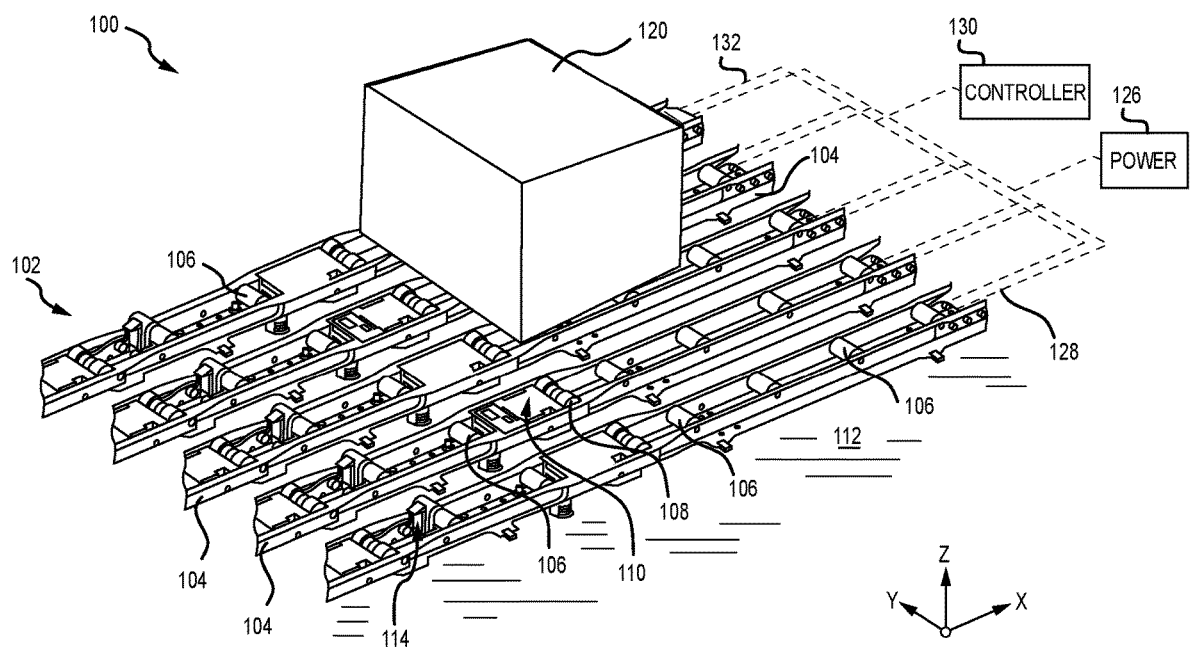
FIG. 1B illustrates a top view of a cargo deck for the aircraft of FIG. 1A, in accordance with various embodiments.

Referring now to FIG. 1B, a portion of a cargo handling system 100 is illustrated, in accordance with various embodiments. The cargo handling system 100 is illustrated with reference to an XYZ coordinate system, with the X-direction extending longitudinally aft and the Z-direction extending vertically with respect to an aircraft in which the cargo handling system 100 is positioned, such as, for example, the aircraft 10 described above with reference to FIG. 1A. In various embodiments, the cargo handling system 100 may define a conveyance surface 102 having a plurality of trays 104 supported by a cargo deck 112, such as, for example, the cargo deck 12 described above with reference to FIG. 1A. The plurality of trays 104 may be configured to support a unit load device (ULD) 120 (or a plurality of ULDs), such as, for example, the unit load device (ULD) 20 described above with reference to FIG. 1A. In various embodiments, the ULD 120 may comprise a container or a pallet configured to hold cargo as described above. In various embodiments, the plurality of trays 104 is disposed throughout the cargo deck 112 and may support a plurality of conveyance rollers 106, where one or more or all of the plurality of conveyance rollers 106 is a passive roller. In various embodiments, the conveyance surface 102 is a planar surface defined by the plurality of conveyance rollers 106.

In various embodiments, the cargo handling system 100 includes a plurality of power drive units (PDUs) 110, each of which may include one or more drive rollers 108 that may be actively powered by a motor. In various embodiments, one or more of the plurality of trays 104 is positioned longitudinally along the cargo deck 112—e.g., along the X-direction extending from the forward end to the aft end of the aircraft. In various embodiments, the plurality of conveyance rollers 106 and the one or more drive rollers 108 may be configured to facilitate transport of the ULD 120 in the forward and the aft directions along the conveyance surface 102. Similarly, one or more of the plurality of trays 104 is positioned laterally along the cargo deck 112—e.g., along the Y-direction extending from a starboard side to a port side of the aircraft—and the plurality of conveyance rollers 106 and the one or more drive rollers 108 may be configured to facilitate transport of the ULD 120 in the starboard and port directions along the conveyance surface 102. During loading and unloading, the ULD 120 may variously contact the one or more drive rollers 108 to provide a motive force for transporting the ULD 120 along the conveyance surface 102. Each of the plurality of PDUs 110 may include an actuator, such as, for example, an electrically operated motor, configured to drive the one or more drive rollers 108 corresponding with each such PDU. In various embodiments, the one or more drive rollers 108 may be raised from a lowered position beneath the conveyance surface 102 to an elevated position above the conveyance surface 102 by the corresponding PDU. As used with respect to cargo handling system 100, the term "beneath" may refer to the negative Z-direction, and the term "above" may refer to the positive Z-direction with respect to the conveyance surface 102. In the elevated position, the one or more drive rollers 108 variously contact and drive the ULD 120 that otherwise rides on the plurality of conveyance rollers 106. Other types of PDUs, which may also be used in various embodiments of the present disclosure, include a drive roller that is held or biased in a position above the conveyance surface by a spring. Without loss of generality, the PDUs as described herein may comprise any type of electrically powered rollers that may be selectively energized to propel or drive the ULD 120 in a desired direction over the cargo deck 112 of the aircraft. The plurality of trays 104 may further support a plurality of restraint devices 114. In various embodiments, each of the plurality of restraint devices 114 may be configured to rotate downward as the ULD 120 passes over and along the conveyance surface 102. Once the ULD 120 passes over any such one of the plurality of restraint devices 114, such restraint device returns to its upright position, either by a motor driven actuator or a bias member, thereby restraining or preventing the ULD 120 from translating in the opposite direction.

In various embodiments, the cargo handling system 100 may include a system controller 130 in communication with each of the plurality of PDUs 110 via a plurality of channels 132. Each of the plurality of channels 132 may be a data bus, such as, for example, a controller area network (CAN) bus. An operator may selectively control operation of the plurality of PDUs 110 using the system controller 130. In various embodiments, the system controller 130 may be configured to selectively activate or deactivate the plurality of PDUs 110. Thus, the cargo handling system 100 may receive operator input through the system controller 130 to control the plurality of PDUs 110 in order to manipulate movement of the ULD 120 over the conveyance surface 102 and into a desired position on the cargo deck 112. In various embodiments, the system controller 130 may include a general purpose processor, a digital signal processor (DSP), an application specific integrated circuit (ASIC), a field programmable gate array (FPGA) or some other programmable logic device, discrete gate or transistor logic, discrete hardware components, or any combination thereof. The cargo handling system 100 may also include a power source 126 configured to supply power to the plurality of PDUs 110 or to the plurality of restraint devices 114 via one or more power buses 128.

Figure 2:
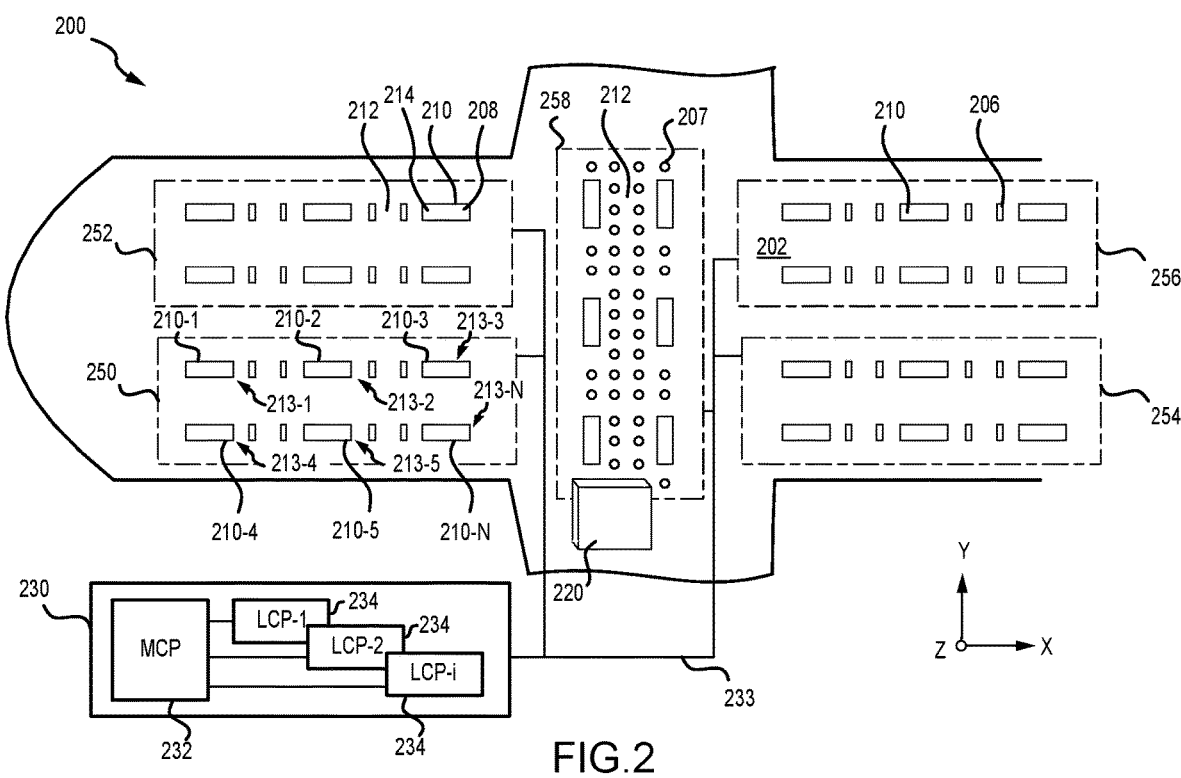
FIG. 2 illustrates a top view of a cargo handling system, in accordance with various embodiments.

Referring now to FIG. 2, a schematic view of a cargo handling system 200 positioned on a cargo deck 212 of an aircraft is illustrated, in accordance with various embodiments. The cargo deck 212 may comprise a plurality of PDUs 210, generally arranged in a matrix configuration about the cargo deck 212. Associated with each of the plurality of PDUs 210 may be one or more drive rollers 208 and a restraint device 214. In various embodiments, the plurality of PDUs 210, the one or more drive rollers 208 and the restraint device 214 share similar characteristics and modes of operation as the plurality of PDUs 110, the one or more drive rollers 108 and the plurality of restraint devices 114 described above with reference to FIG. 1B. Each of the one or more drive rollers 208 is generally configured to selectively protrude from a conveyance surface 202 of the cargo deck 212 in order to engage with a surface of a ULD 220 as it is guided onto and over the conveyance surface 202 during loading and unloading operations. A plurality of conveyance rollers 206 may be arranged among the plurality of PDUs 210 in a matrix configuration as well. The plurality of conveyance rollers 206 may comprise passive elements, and may include roller ball units 207 that serve as stabilizing and guiding apparatus for the ULD 220 as it is conveyed over the conveyance surface 202 by the plurality of PDUs 210.

In various embodiments, the cargo handling system 200 or, more particularly, the conveyance surface 202, is divided into a plurality of sections. As illustrated, for example, the conveyance surface 202 may include a port-side track and a starboard-side track along which a plurality of ULDs may be stowed in parallel columns during flight. Further, the conveyance surface 202 may be divided into an aft section and a forward section. Thus, the port-side and the starboard-side tracks, in various embodiments and as illustrated, may be divided into four sections—e.g., a forward port-side section 250, a forward starboard-side section 252, an aft port-side section 254 and an aft starboard-side section 256. The conveyance surface 202 may also have a lateral section 258, which may be used to transport the ULD 220 onto and off of the conveyance surface 202 as well as transfer the ULD 220 between the port-side and starboard-side tracks and between the aft section and the forward section. The configurations described above and illustrated in FIG. 2 are exemplary only and may be varied depending on the context, including the numbers of the various components used to convey the ULD 220 over the conveyance surface 202. In various embodiments, for example, configurations having three or more track configurations, rather than the two-track configuration illustrated in FIG. 2, may be employed.

Each of the aforementioned sections—i.e., the forward port-side section 250, the forward starboard-side section 252, the aft port-side section 254 and the aft starboard-side section 256—may include one or more of the plurality of PDUs 210. Each one of the plurality of PDUs 210 has a physical location on the conveyance surface 202 that corresponds to a logical address within the cargo handling system 200. For purposes of illustration, the forward port-side section 250 is shown having a first PDU 210-1, a second PDU 210-2, a third PDU 210-3, a fourth PDU 210-4, a fifth PDU 210-5 and an N-th PDU 210-N. The aforementioned individual PDUs are located, respectively, at a first location 213-1, a second location 213-2, a third location 213-3, a fourth location 213-4, a fifth location 213-5 and an N-th location 203-N. In various embodiments, the each of the aforementioned individual PDUs on the conveyance surface 202 may have a unique location (or address) identifier, which, in various embodiments, may be stored in an RFID device or a similar device associated with each individual PDU.

In various embodiments, an operator may control operation of the plurality of PDUs 210 using one or more control interfaces of a system controller 230, such as, for example, the system controller 130 described above with reference to FIG. 1B. For example, an operator may selectively control the operation of the plurality of PDUs 210 through an interface, such as, for example, a master control panel 232 (MCP). In various embodiments, the cargo handling system 200 may also include one or more local control panels 234 (LCP). In various embodiments, the master control panel 232 may communicate with the local control panels 234. The master control panel 232 or the local control panels 234 may also be configured to communicate with or send or receive control signals or command signals to or from each of the plurality of PDUs 210 or to a subset of the plurality of PDUs 210, such as, for example, the aforementioned individual PDUs described above with reference to the forward port-side section 250. For example, a first local control panel LCP-1 may be configured to communicate with the PDUs residing in the forward port-side section 250, a second local control panel LCP-2 may be configured to communicate with the PDUs residing in the forward starboard-side section 252, and one or more additional local control panels LCP-i may be in communication with the PDUs of one or more of the aft port-side section 254, the aft starboard-side section 256 and the lateral section 258. Thus, the master control panel 232 or the local control panels 234 may be configured to allow an operator to selectively engage or activate one or more of the plurality of PDUs 210 to propel the ULD 220 along conveyance surface 202.

In various embodiments, each of the plurality of PDUs 210 may be configured to receive a command from the master control panel 232 or one or more of the local control panels 234. In various embodiments, the commands may be sent or information exchanged over a channel 233, which may provide a communication link between the system controller 230 and each of the plurality of PDUs 210. In various embodiments, a command signal sent from the system controller 230 may include one or more logical addresses, each of which may correspond to a physical location of one of the plurality of PDUs 210. Each of the plurality of PDUs 210 that receives the command signal may determine if the command signal is intended for that particular PDU by comparing its own address to the address included in the command signal.

Figure 3A:
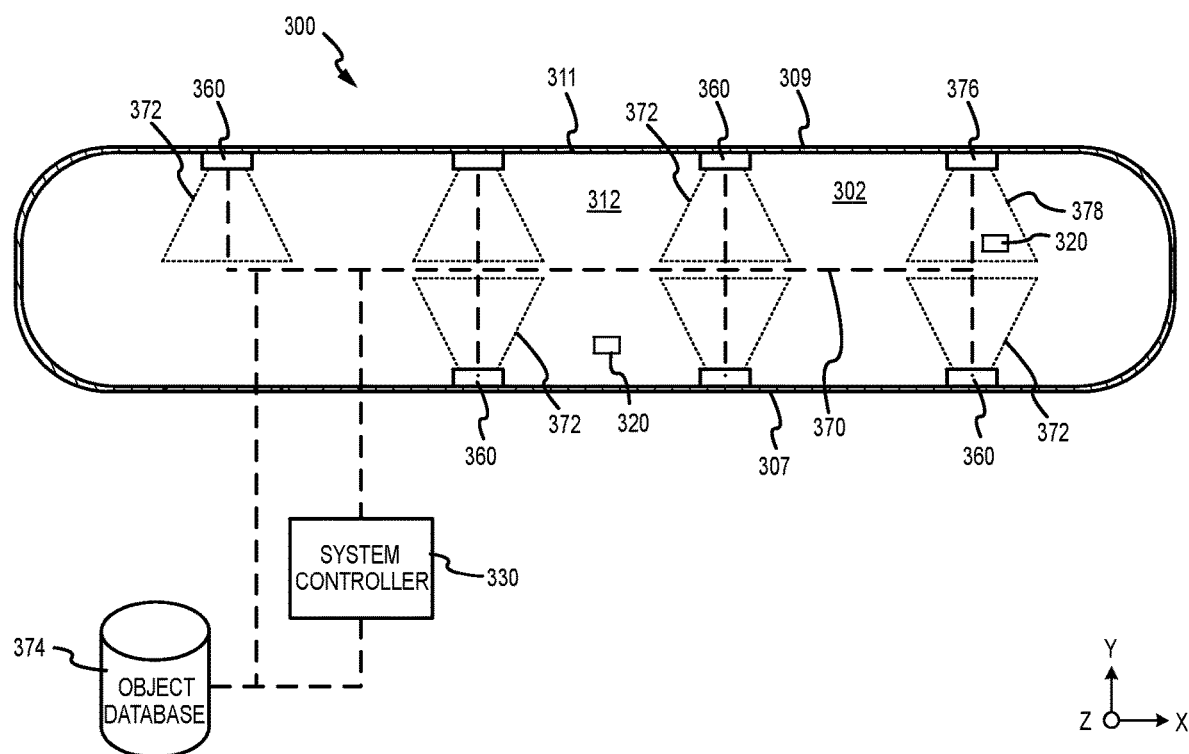
FIG. 3A illustrates a top view of a cargo handling system configured for autonomous operation, in accordance with various embodiments.
Figure 3B:
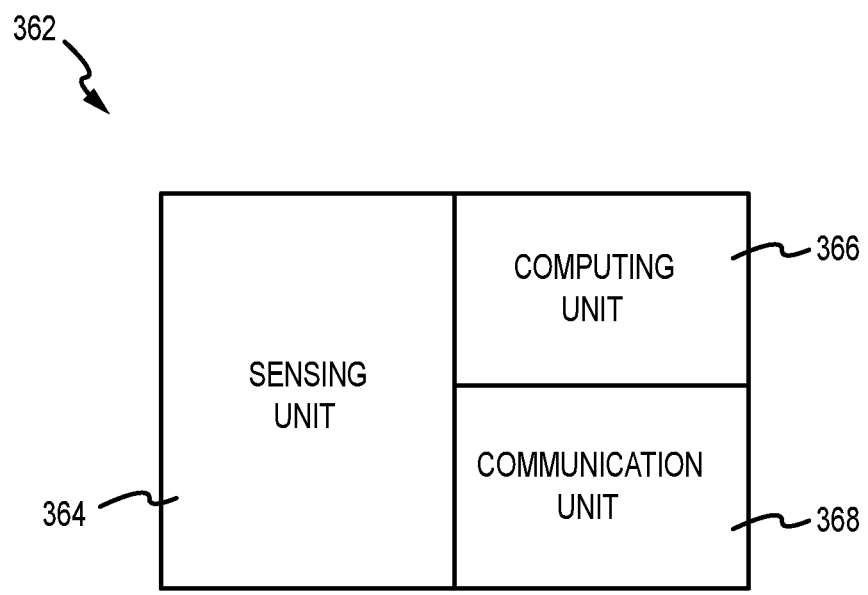
FIG. 3B illustrates a block diagram of a sensing agent for use in a cargo handling system configured for autonomous operation, in accordance with various embodiments.

Referring now to FIGS. 3A and 3B, a schematic view of a cargo handling system 300 positioned on a cargo deck 312 of an aircraft is illustrated, in accordance with various embodiments. As described in further detail below, the cargo handling system 300 is an autonomous cargo handling system configured to perform several operations, such as, for example, monitor and gather data, estimate current situations or scenarios in the cargo hold, control movement of cargo (e.g., a ULD or a pallet) and provide warnings when a potential for problems or anomalies (e.g., collisions) arise during a cargo loading or unloading process. For example, in various embodiments, the cargo handling system 300 may, among other things, monitor and gather data about the cargo loading or unloading process to more accurately control the movement of a ULD 320 (or a plurality of ULDs) over a conveyance surface 302; assess and detect a potential for collisions of the ULD 320 with the walls of an aircraft (e.g., a port-side wall 307 or a starboard-side wall 309, which together define, in part, an aircraft envelope 311) or other objects on the cargo deck 312; detect the presence of human operators on the cargo deck 312; monitor each of a plurality of PDUs (e.g., the plurality of PDUs 210 described above with reference to FIG. 2) incorporated into the cargo deck 312; predict a current dynamic model of the plurality of PDUs; or perform various other operations, as discussed herein. In this regard, and in accordance with various embodiments, the cargo handling system 300 may provide information about the status of each ULD on the cargo deck 312 or each PDU incorporated into the cargo deck 312, as well as information regarding the presence of human operators or other objects on the cargo deck 312, in order to control the movement of a plurality of ULDs through the cargo deck 312 with a greater level of autonomy and safety and at a lower cost than cargo systems requiring greater human interaction.

With continued reference to FIGS. 3A and 3B, the cargo handling system 300 comprises a plurality of sensing agents 360 (e.g., a first sensing agent, a second sensing agent . . . and an Nth sensing agent). Each of the plurality of sensing agents 360 may be configured to monitor and gather data during the cargo loading or unloading process and during transportation of the cargo. The plurality of sensing agents 360 may be located in any suitable location on cargo deck 312 capable of monitoring the cargo loading process. For example, and in various embodiments, one or more of the plurality of sensing agents 360 may be coupled to an inner surface of the aircraft envelope 311, a ceiling within the aircraft or at any other suitable location. The plurality of sensing agents 360 may be located at any suitable elevation within the aircraft envelope 311, such as, for example, at a midpoint between the aircraft ceiling and the cargo deck 312. The plurality of sensing agents 360 may be stationary or may be configured to rotate or translate within the aircraft envelope 311 and with respect to the XYZ coordinate system. The plurality of sensing agents 360 may be dispersed throughout the aircraft envelope 311 to completely monitor a loading or unloading process and to establish a distributed network of sensing agents. Each of the plurality of sensing agents 360 may comprise any suitable apparatus capable of monitoring and gathering data during the loading or unloading process. For example, each of the plurality of sensing agents 360 may be computer based, comprising a processor, a tangible non-transitory computer-readable memory and a network interface, along with other suitable system software or hardware components. Instructions stored on the tangible non-transitory computer-readable memory enable the plurality of sensing agents 360 to perform various functions, as described herein.

In various embodiments, one or more of the plurality of sensing agents 360 may also comprise various sub-components to aid in monitoring and gathering data during operation of the cargo deck 312. For example, and with reference to FIG. 3B, one of the plurality of sensing agents 360 (e.g., a sensing agent 362) may comprise one or more of a sensing unit 364, a computing unit 366 and a communication unit 368. The sensing unit 364, the computing unit 366 and the communication unit 368 may be in operative or electronic communication with each other. As discussed further herein, the computing unit 366 may include logic configured to control the sensing unit 364 and the communication unit 368. In various embodiments, each one or more of the plurality of sensing agents 360 may also comprise any other suitable or desirable sub-component, such as, for example, an actuation component configured to provide an actuating force to one or more of the plurality of PDUs within the cargo deck 312. In that respect the computing unit 366, via the communication unit 368 or via direct control of the actuation component, may variably control the one or more of the plurality of PDUs.

In various embodiments, the sensing unit 364 may comprise any suitable apparatus, hardware or software capable of monitoring a portion of the cargo deck 312. Further, sensing unit 364 may comprise a plurality of devices, including, for example, one or more of a camera, a structured light sensor, a light detection and ranging (LiDAR) sensor, an infrared sensor, a depth sensor (e.g., a MICROSOFT® Kinect®, a MYNT® Eye, or an ASUS® Xtion PRO), a three-dimensional scanner, an ultrasound range finder, a radar sensor or any other suitable sensing device. The sensing unit 364 may also comprise a sensor configured to measure a weight of an object (e.g., a weight sensor), such as, for example, a pressure sensor or a piezoelectric sensor or the like.

In various embodiments, the computing unit 366 may comprise any suitable computing device capable of controlling the sensing agent 362. For example, the computing unit 366 may include a processor and a tangible, non-transitory memory. The computing unit 366 may comprise one or more logic modules that implement logic to control the sensing unit 364 or the communication unit 368. The computing unit 366 may include a general purpose processor, a digital signal processor (DSP), an application specific integrated circuit (ASIC), a field programmable gate array (FPGA) or other programmable logic device, discrete gate or transistor logic, a graphics processing unit (GPU), discrete hardware components, or any combination thereof. In various embodiments, use of the computing unit 366 in each one of the plurality of sensing agents 360 may allow each sensing agent to perform processing operations locally (e.g., in a decentralized manner), thereby at least partially reducing the bandwidth requirements relative to a central processing system (e.g., transmitting high bandwidth data, such as a video feed, to a central processing location). In various embodiments, the processing operations performed by the computing unit 366 include reasoning tasks, such as, for example, sensor fusion, analysis of a current situation (or a situational awareness) in the cargo hold based on fused sensor data and predictions of futures states (e.g., collisions).

In various embodiments, the communication unit 368 may comprise any suitable communications interface. The communication unit 368 enables data to be transferred among the plurality of sensing agents 360. The communication unit 368, for example, may include a modem, a network interface (e.g., an Ethernet card), a communications port, a Personal Computer Memory Card International Association (PCMCIA) slot and card or the like. Data transferred via the communication unit 368 may be in the form of electronic, electromagnetic or optical signals, or other signals capable of being transmitted and received by the communication unit 368. These signals are provided to the communication unit 368 via a communications path or a network 370. The network 370 is configured to transmit the signals and may be implemented using a wire, a cable, a fiber optic line, a telephone line, a cellular link, a radio frequency (RF) link, a wireless link or other communication channel. In such manner, the network 370 may interconnect each of the plurality of sensing agents 360, via the communication unit 368 corresponding to individual sensing agents.

In various embodiments, and with continued reference to FIGS. 3A and 3B, the cargo handling system 300 may comprise a system controller 330 in operative or electronic communication with an object database 374. The system controller 330 may also be in operative or electronic communication with each of the plurality of sensing agents 360 via the network 370 and configured to control each of the plurality of sensing agents 360. The system controller 330 may include a general purpose processor, a digital signal processor (DSP), an application specific integrated circuit (ASIC), a field programmable gate array (FPGA) or other programmable logic device, discrete gate or transistor logic, discrete hardware components, or any combination thereof, and may also include a tangible, non-transitory memory. Similar to the system controller 130 described above with reference to FIG. 1B and the system controller 230 described above with reference to FIG. 2, the system controller 330 may also be in operative or electronic communication with a plurality of PDUs (e.g., the plurality of PDUs 210 described above with reference to FIG. 2). In such respect, the system controller 330 may be configured to control the plurality of PDUs based on the monitoring performed by the plurality of sensing agents 360 (e.g., based on the object property, the object model, etc.). In various embodiments, each of the plurality of sensing agents 360 may also be in operative or electronic communication with the object database 374, such that each of the plurality of sensing agents 360 may interact with the object database 374 without first interfacing with the system controller 330.

In various embodiments, the object database 374 comprises a suitable data structure, such as, for example, a database (including a relational, hierarchical, graphical, blockchain, or object-oriented structure or any other database configuration) or a flat file structure. The object database 374 may be configured to store and maintain data relating to the cargo handling system 300. For example, the object database 374 may store and maintain models comprising data of known object properties for various models of ULDs. The object database 374 may also store generated object models. In accordance with various embodiments, the object database 374 may store any other suitable data related to the cargo handling system 300, such as, for example, a health status of the cargo handling system 300 (e.g., information concerning the operability of each of the plurality of sensing agents 360 or the plurality of PDUs), the location of each known object or ULD, the location of each non-ULD, cargo properties, information concerning the cargo deck 312 (e.g., the state of one or more of a plurality of restraint devices, such as, for example, the plurality of restraint devices 114 described above with reference to FIG. 1B) or any other suitable data corresponding to a cargo handling system.

In various embodiments, and with continued reference to FIGS. 3A and 3B, the plurality of sensing agents 360 may be configured to perform one or more tasks during the cargo loading or unloading process. For example, the plurality of sensing agents 360 may be configured to perform a ULD localization task, a non-ULD detection task or a ULD modeling task. During the ULD localization task, each of the plurality of sensing agents 360 may monitor a sensing zone 372 (corresponding to each of the plurality of sensing agents 360) to locate and generate data on objects within the sensing zone 372. For example, a first sensing agent 376 transmits data concerning any objects (both ULD and non-ULD) within a first sensing zone 378 to the system controller 330 for analysis and determination of the identity and location of any ULDs within the first sensing zone 378. During the non-ULD detection task, the system controller 330 analyzes the data transmitted during the ULD localization task to determine whether an object within the first sensing zone 378 is not a ULD and, if not, what the object is (e.g., a human operator). During the ULD modeling task, the system controller 330 compares the data transmitted by the plurality of sensing agents 360 and analyzes the data for consistency, accuracy or quality. Discrepancies among the data may then be used to detect or identify internal faults that may exist with a particular sensing agent (e.g., a malfunctioning or occluded sensor unit, a faulty communication unit, a local power outage, a hardware or mechanical failure, or an incorrect positioning of a sensing agent). In various embodiments, the plurality of sensing agents 360 may also be configured to transmit data used to perform various other tasks during the cargo loading or unloading process, such as, for example, controlling the motion of a ULD, assessing prognostics and health management of the cargo handling system 300, determining weight and balance assessments of a ULD or determining the presence of a human on the cargo deck 312, or any other suitable or desired task.

Figure 4:
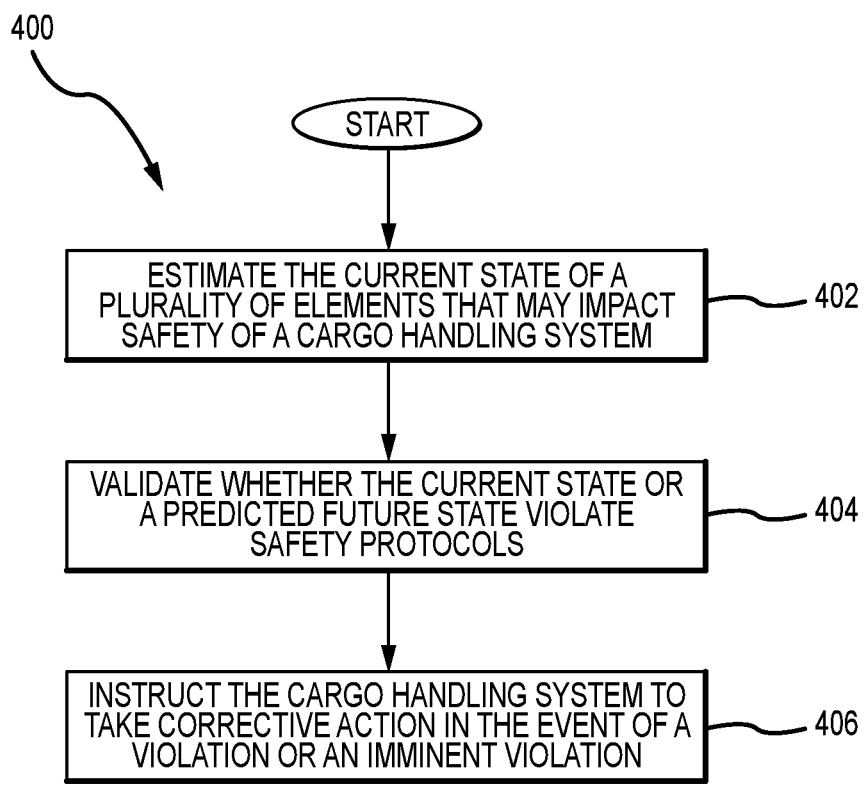
FIG. 4 describes a method for performing a safety assessment of a cargo handling system configured for autonomous operation.

Referring now to FIG. 4, a flowchart 400 is provided that illustrates various steps (performed in no preferred order) used in a method for performing a safety assessment of a cargo handling system configured for autonomous operation, such as, for example, the cargo handling system 300 described above with reference to FIGS. 3A and 3B. In various embodiments, the method may begin at a first step 402 (or a situation estimation step), where a situation estimation is performed by a system controller (e.g., the system controller 330 described above with reference to the cargo handling system 300). In various embodiments, the system estimation step estimates the current state of a plurality of elements (or a plurality of safety-impacting elements) that may impact the safety of a cargo handling operation, such as, for example, a loading or unloading process. The plurality of elements typically includes, without limitation, the status of a plurality of restraint devices (e.g., the plurality of restraint devices 114 described above with reference to FIG. 1B), the positioning of cargo loads or ULDs throughout a cargo deck (e.g., the cargo deck 312) or the location of any humans on the cargo deck. In various embodiments, the cargo loads or ULDs and any humans on the cargo deck may be referred to as a plurality of objects on the cargo deck or the cargo handling system. In various embodiments, the situation estimation step is performed by receiving, by the system controller, a run-time database from a plurality of sensing agents (e.g., the plurality of sensing agents 360). The run-time database typically includes, without limitation, a visual representation (e.g., a still photo or a video stream, including two-dimensional or three-dimensional visual data) or an audio representation (e.g., a sound measurement in decibels or an audio stream), from which a mapping of all objects on the cargo deck may be determined, a restraint device data, from which the status of each of the plurality of restraint devices may be determined. In various embodiments, the sensor data received from the plurality of sensing agents comprises the run-time database. The system controller then processes the run-time database to generate a run-time mapping of the positions (or trajectories) of all cargo loads and humans on the cargo deck and the status of each of the plurality of restraint devices.

In various embodiments, the method includes a second step 404 (or a validation step), where a validation is performed by the system controller. In various embodiments, the system validation step validates whether a current or a run-time state of the cargo handling system (e.g., the current or run-time positioning or trajectories of all cargo loads or humans on the cargo deck and the status of each of the plurality of restraint devices) or future states predicted using the current or run-time state, violate any safety protocols. The safety protocols may include, for example, a prohibition against collisions between ULDs (e.g., a first ULD is prohibited from colliding with a second ULD, either of which may be stationary or in transit over the cargo deck or a conveyance surface), a prohibition against a ULD contacting one or more of the walls that define an aircraft envelope (e.g., the port-side wall 307 or the starboard-side wall 309, which together define, in part, the aircraft envelope 311 described above), a prohibition against a ULD being conveyed into a human safety area (e.g., a location where a human operator may be present), or a prohibition against a ULD being transported toward where a human may be present anywhere on the cargo deck or within the aircraft envelope. Other safety protocols may include, for example, a prohibition against taxiing, takeoff or landing by the aircraft where an unrestrained ULD exists on the cargo deck or where a human is present on the cargo deck (e.g., the human is sleeping or otherwise unaware of taxiing, takeoff or landing being imminent).

In various embodiments, a collision between a first unit load device (or a first ULD) and a second unit load device (or a second ULD) or a first ULD and the aircraft envelope at a future time (or a future state) may be predicted using the current state (e.g., the run-time trajectory or the run-time position and the run-time velocity of each of the ULDs) and a suitable time-step (e.g., one second or a fraction of a second). Multiplying a run-time velocity for each of the first ULD and the second ULD (e.g., a first run-time velocity of the first ULD and a second run-time velocity of the second ULD, each in vector form) by the time-step and adding the results, respectively, to a run-time position of the first ULD and a run-time position of the second ULD provides an estimate for the future state or the future location of each ULD. In other words, the future position or the future location of a ULD at a future state is determined by translating the vector product of the velocity and the time step from a first position at the current state to a second position at the future state. The future state of the ULD may then be compared with the future state of each of the other ULDs. If, for example, a first object space or a first volume space of a first ULD (or a first object) at a future state overlaps a second object space or a second volume space of a second ULD (or a second object) at the future state, then a collision may be said to be imminent. Note the overlap need not be entire, but may be considered, in various embodiments, to have occurred once the first object space comes in contact with the second volume space. A similar approach may be applied with respect to collisions between a ULD and a wall or a ULD and a human. By using an object space or a volume space (e.g., a cylindrical volume or a spherical volume) larger than that of the actual ULD, a safety factor or tolerance may be built into the collision analysis.

In various embodiments, the method includes a third step 406 (or a decision step), where a determination or a decision whether to take or implement a corrective action or a preventative action is performed by the system controller. In various embodiments, at the decision step, the system controller evaluates the data generated at the system validation step and instructs the cargo handling system to take appropriate action in the event of a safety protocol being violated or being imminent of a violation. For example, in the event of a predicted imminent collision between the first ULD and the second ULD, the system controller instructs the cargo handling system to halt or slow a conveyance or a translation of either or both of the first ULD and the second ULD until the threat of collision has passed, which may require further instruction by the processor to alter the trajectory of one or both of the first ULD and the second ULD by directing one or more of a plurality of PDUs (e.g., the plurality of PDUs 210 described above with reference to FIG. 2) to convey the first ULD in a lateral direction away from the second ULD. In the event of an imminent contact between a ULD and a wall of the aircraft envelope, the system controller instructs the cargo handling system to halt or slow conveyance of the ULD or to alter the trajectory of the ULD by directing one or more of the plurality of PDUs to convey the ULD in a lateral direction away from the wall. In the event a ULD is being conveyed into a human safety area, the system controller instructs the cargo handling system to halt or slow conveyance of the ULD or to alter the trajectory of the ULD by directing one or more of the plurality of PDUs to convey the ULD in a direction away from the human safety area. In the event a ULD is being transported toward where a human may be present anywhere on the cargo deck or within the aircraft envelope, the system controller instructs the cargo handling system to halt or slow conveyance of the ULD or to alter the trajectory of the ULD by directing one or more of the plurality of PDUs to convey the ULD in a direction away from the human or to trigger an alarm (e.g., an audible or visible signal) to alert the human of the approaching ULD. In the event an unrestrained ULD exists on the cargo deck and taxiing, takeoff or landing by the aircraft is imminent, the system controller instructs the cargo handling system to trigger an alarm (e.g., an audible or visible signal) to alert the crew of the unrestrained ULD. Similarly, in the event a human is present on the cargo deck and taxiing, takeoff or landing by the aircraft is imminent, the system controller instructs the cargo handling system to trigger an alarm (e.g., an audible or visible signal) to alert the human or the crew of the presence of the human.

In various embodiments, the system described above provides a method for assessing safety in a cargo area of an aircraft by monitoring a current state and making predictions of a future state via a system controller. The method aims not only to evaluate the cargo handling system or its behavior (e.g., calculating predictions of imminent collision between ULDs), but also incorporates the effects of external factors, such as, for example, unexpected objects (e.g., a dislodged ULD) or humans on the cargo deck. Thereby, the method increases overall safety of the cargo handling procedures; aids operators in identifying potentially unsafe conditions prior to occurrence of an accident (e.g., collisions between ULDs or between a ULD and a wall, unrestrained ULDs or the presence of a human on the cargo deck during taxing, takeoff or landing), reducing the amount of training the operators might otherwise require; improves safety in mixed environments, where humans and machines interact; and assists owners or operators of cargo aircraft in validating whether safety procedures or protocols are being adhered. In various embodiments, the results of the method may be provided as a warning to an operator or as data to an owner or operator of the cargo handling system and used to improve training. In addition, the safety protocols may be updated using such data and uploaded to the cargo handling system by the owner or the operator.

In various embodiments, components, modules, or engines of the systems or apparatus described herein may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® operating system, and the like. The micro-app may be configured to leverage the resources of a larger operating system and associated hardware via a set of predetermined rules that govern the operation of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system that monitors various hardware components and then communicates a detected input from the hardware to the micro-app.

The system and methods described herein may also be described in terms of functional block components, screen shots, optional selections, and various processing steps. It should be appreciated that such functional blocks may be realized by any number of hardware or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFTx Active Server Pages, assembly, PERL®, PHP, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like.

The various system components discussed herein may also include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; or like data useful in the operation of the system. As those skilled in the art will appreciate, users computer may include an operating system (e.g., WINDOWS®, UNIX®, LINUX®, SOLARIS®, MACOS®, etc.) as well as various conventional support software and drivers typically associated with computers.

As used herein, the term "network" includes any cloud, cloud computing system, or electronic communications system or method that incorporates hardware or software components. Communication among the components of the systems may be accomplished through any suitable communication channels, such as, for example, a telephone network, an extranet, an intranet, or an internet. Such communications may also occur using online communications, satellite communications, off-line communications, wireless communications, transponder communications, local area network (LAN), wide area network (WAN), or virtual private network (VPN). Moreover, the systems may be implemented with TCP/IP communications protocols, IPX, APPLETALK®, IP-6, NetBIOS, OSI, any tunneling protocol (e.g., IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method for performing a safety assessment of a cargo handling system controlled by a processor and having a plurality of sensing agents, comprising:
    receiving, by the processor, a run-time database from the plurality of sensing agents, the run-time database including video data and audio data from which a trajectory of a plurality of objects on the cargo handling system is determined, wherein the plurality of objects includes a first unit load device and a second unit load device and wherein the audio data is at least one of a sound measurement in decibels or an audio stream;
    generating, by the processor, a mapping of the trajectory of the plurality of objects;
    validating, by the processor, whether a run-time state of the cargo handling system is in violation of a safety protocol;
    determining, by the processor, whether to implement a corrective action; and
    responsive to determining that the corrective action is to be implemented, instructing, by the processor, the cargo handling system to slow or to halt a translation along a conveyance surface of the cargo handling system of at least one of the first unit load device or the second unit load device.

2. The method of claim 1, wherein generating by the processor the mapping of the trajectory of the plurality of objects includes predicting a future state of the first unit load device and the second unit load device.

3. The method of claim 2, wherein predicting the future state of the first unit load device includes multiplying a first run-time velocity by a time step to obtain a future location of the first unit load device and predicting the future state of the second unit load device includes multiplying a second run-time velocity by the time step to obtain the future location of the second unit load device.

4. The method of claim 3, wherein the violation of the safety protocol occurs if the processor determines an overlap between a first object space surrounding the first unit load device and a second object space surrounding the second unit load device at the future state.

5. The method of claim 1, wherein the plurality of objects includes a unit load device and a wall of an aircraft envelope, the cargo handling system being housed within the aircraft envelope.

6. The method of claim 5, wherein generating by the processor the mapping of the trajectory of the plurality of objects includes predicting a future state of the unit load device with respect to the wall.

7. The method of claim 6, wherein predicting the future state of the unit load device includes multiplying a run-time velocity by a time step to obtain a future location of the unit load device with respect to the wall.

8. The method of claim 7, wherein the violation of the safety protocol occurs if the processor determines an overlap between an object space surrounding the unit load device and the wall.

9. The method of claim 7, wherein the corrective action includes instructing, by the processor, the cargo handling system to slow or to halt a translation along a conveyance surface of the cargo handling system of the unit load device.

10. The method of claim 1, wherein the plurality of objects includes a unit load device and a human with an aircraft envelope, the cargo handling system being housed within the aircraft envelope.

11. The method of claim 10, wherein generating by the processor the mapping of the trajectory of the plurality of objects includes predicting a future state of the unit load device with respect to the human.

12. The method of claim 11, wherein predicting the future state of the unit load device includes multiplying a run-time velocity by a time step to obtain a future location of the unit load device with respect to the human.

13. The method of claim 12, wherein the violation of the safety protocol occurs if the processor determines an overlap between an object space surrounding the unit load device and the human.

14. The method of claim 13, wherein the corrective action includes instructing, by the processor, the cargo handling system to slow or to halt a translation along a conveyance surface of the cargo handling system of the unit load device.

15. A cargo handling system configured for autonomous control, comprising:
a processor in operable communication with a plurality of sensing agents, the plurality of sensing agents configured to transmit a run-time database from the plurality of sensing agents, the run-time database including video data and audio data from which a trajectory of a plurality of objects on the cargo handling system is determined,
wherein the plurality of objects includes a first unit load device and a second unit load device,
wherein the audio data is at least one of a sound measurement in decibels or an audio stream,
wherein the processor is configured to generate a mapping of the trajectory of the plurality of objects, validate whether a run-time state of the cargo handling system is in violation of a safety protocol, determine whether to implement a corrective action, and, responsive to determining that the corrective action is to be implemented, slow or to halt a translation along a conveyance surface of the cargo handling system of at least one of the first unit load device or the second unit load device.

16. The cargo handling system of claim 15, wherein the processor is configured to predict a future state of the plurality of objects by multiplying a run-time velocity by a time step for the plurality of objects to obtain a future location of the plurality of objects.

17. The cargo handling system of claim 16, wherein the processor is configured to determine an overlap between a first object space surrounding a first object of the plurality of objects and a second object space surrounding a second object of the plurality of objects.

* * * * *